(12) United States Patent
Kim

(10) Patent No.: US 11,396,993 B2
(45) Date of Patent: Jul. 26, 2022

(54) LAMP FOR VEHICLE

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/370,068

(22) Filed: Jul. 8, 2021

(65) Prior Publication Data

US 2022/0034473 A1  Feb. 3, 2022

(30) Foreign Application Priority Data

Jul. 28, 2020  (KR) .......................... 10-2020-0093928

(51) Int. Cl.
*F21S 41/683* (2018.01)
*F21S 41/47* (2018.01)
*F21S 41/25* (2018.01)

(52) U.S. Cl.
CPC ............. *F21S 41/683* (2018.01); *F21S 41/25* (2018.01); *F21S 41/47* (2018.01)

(58) Field of Classification Search
None
See application file for complete search history.

(56) References Cited

U.S. PATENT DOCUMENTS

| 7,896,512 | B2 * | 3/2011 | Tatara | F21S 41/148 |
| | | | | 362/43 |
| 9,623,796 | B2 * | 4/2017 | Takahashi | F21S 43/237 |
| 9,964,276 | B2 * | 5/2018 | Yamamoto | F21S 41/336 |
| 2014/0022806 | A1 * | 1/2014 | Shibata | B60Q 1/06 |
| | | | | 362/508 |
| 2014/0321132 | A1 * | 10/2014 | Shibata | B60Q 1/0683 |
| | | | | 362/460 |
| 2014/0340922 | A1 * | 11/2014 | Matsumoto | F21S 45/43 |
| | | | | 362/516 |

\* cited by examiner

*Primary Examiner* — Elmito Breval
(74) *Attorney, Agent, or Firm* — NovoTechIP International PLLC

(57) ABSTRACT

The present disclosure relates to a lamp for a vehicle, the lamp including: a light source provided in a housing; an inner lens provided in front of the light source; a cover member disposed between the inner lens and the light source and configured to move between a first position at which a front side of the light source is opened and a second position at which the front side of the light source is closed; and a drive part configured to selectively move the cover member from the first position to the second position, thereby improving marketability and design characteristics of the lamp.

14 Claims, 13 Drawing Sheets

LAMP FOR VEHICLE

CROSS-REFERENCE TO RELATED APPLICATIONS

This application claims priority to and the benefit of Korean Patent Application No. 10-2020-0093928 filed in the Korean Intellectual Property Office on Jul. 28, 2020, the entire contents of which are incorporated herein by reference.

BACKGROUND OF THE INVENTION

1. Field of the Invention

The present disclosure relates to a lamp for a vehicle, and more particularly, to a lamp for a vehicle, which is capable of improving marketability and design characteristics thereof.

2. Discussion of Related Art

In general, vehicles are provided with various types of lamps. The lamps perform a lighting function that allows a driver to easily recognize objects positioned around the vehicle while the vehicle travels at night. The lamps also perform a signal function to inform drivers in other vehicles and pedestrians on the road of a traveling state of the host vehicle.

For example, the lamps include headlamps (or headlights) and fog lamps used for the lighting function, and turn signal lamps, tail lamps, brake lamps, and side markers used for the signal function. Regulations define the installation criteria and specifications of these lamps for a vehicle to enable the lamps to sufficiently exhibit the functions.

Among the lamps for a vehicle, the headlamp provides a low-beam pattern or a high-beam pattern to ensure a front visual field of the driver while the vehicle travels at night. The headlamp plays a significantly important role in safe driving.

Meanwhile, recently, the exterior design of the lamp itself is also considered important in addition to the performance of the lamp. For example, according to a survey of a company that surveyed persons who purchased the products, the buyers preferentially considered the design of the products when purchasing the products. According to the results, it can be seen that the exterior design of the product has a significant influence on the product purchase.

In the related art, however, internal structures (e.g., light sources and optical systems) of the lamp are exposed directly to the outside, making it difficult to implement various types of design of the lamp. As a result, there is a limitation in implementing design characteristics, and it is difficult to meet customers' desires.

In addition, it is difficult to selectively change lighting images made by the lamps in the related art. Further, a light source and an optical system need to be additionally provided to change the lighting images, which complicates a structure of the lamp and a process of manufacturing the lamp and increases costs required to manufacture the lamp.

Therefore, recently, various studies are conducted to improve the design characteristics and commercial value of the lamp, but the study results are still insufficient. Accordingly, there is a need to develop a technology to improve the design characteristics and commercial value of the lamp.

BRIEF SUMMARY OF THE INVENTION

The present disclosure has been made in an effort to provide a lamp for a vehicle, which is capable of improving marketability and design characteristics thereof.

The present disclosure has also been made in an effort to selectively hide an internal structure of a lamp and improve design characteristics of the lamp.

The present disclosure has also been made in an effort to produce a high-grade product, improve marketability, and satisfy a user's needs.

The present disclosure has also been made in an effort to selectively change lighting images made by a lamp.

The objects to be achieved by the embodiments are not limited to the above-mentioned objects, but also include objects or effects that may be understood from the solutions or embodiments described below.

In one aspect, the present disclosure provides a lamp for a vehicle, the lamp including: a light source provided in a housing; an inner lens provided in front of the light source; a cover member disposed between the inner lens and the light source and configured to move between a first position at which a front side of the light source is opened and a second position at which the front side of the light source is closed; and a drive part configured to selectively move the cover member from the first position to the second position.

This is to improve marketability and design characteristics of the lamp for a vehicle.

In the related art, internal structures (e.g., light sources and optical systems) of the lamp are exposed directly to the outside, making it difficult to implement various types of design of the lamp. As a result, there is a limitation in implementing design characteristics, and it is difficult to meet customers' desires.

In addition, it is difficult to selectively change lighting images made by the lamps in the related art. Further, a light source and an optical system need to be additionally provided to change the lighting images, which complicates a structure of the lamp and a process of manufacturing the lamp and increases costs required to manufacture the lamp.

However, according to the embodiment of the present disclosure, the cover member is provided in front of the light source, and the front side of the light source is opened or closed by the cover member, such that the internal structure of the lamp may be selectively hidden. Therefore, it is possible to obtain an advantageous effect of implementing an aesthetic external appearance of the lamp and improving the design characteristics of the lamp.

Among other things, according to the embodiment of the present disclosure, since the front side of the light source is selectively opened or closed by the cover member, it is possible to obtain an advantageous effect of minimizing deterioration in properties of light emitted from the lamp (e.g., deterioration in properties of light caused when the light passes through an opaque deposition layer provided on an inner surface of an outer lens) when the lamp is turned on. Further, it is possible to obtain an advantageous effect of more effectively hiding the internal structure of the lamp when the lamp is turned off.

The cover member may move from the first position to the second position (or from the second position to the first position) by various methods in accordance with required conditions and design specifications.

For example, the cover member may linearly move from the first position to the second position.

The cover member may have various structures capable of selectively closing the front side of the light source. For example, the cover member may include: a first cover block; and a second cover block connected to the first cover block. The number of cover blocks and the structure for connecting the cover blocks constituting the cover member may be variously changed in accordance with required conditions and design specifications.

According to the exemplary embodiment of the present disclosure, the lamp for a vehicle may include: a guide groove provided in the housing; and a guide rail provided on the cover member and accommodated in the guide groove so as to be linearly movable.

Since the guide rails provided on the cover member move along the guide grooves provided in the housing as described above, the stable linear movement of the cover member relative to the housing may be ensured. Therefore, it is possible to obtain an advantageous effect of inhibiting the separation of the cover member and stably maintaining the arrangement state of the cover member.

The drive part may have various structures capable of moving the cover member.

For example, the drive part may include: a driving source; and a rotary member provided to be rotatable by the driving source and connected to the cover member, and the cover member may be linearly moved selectively from the first position to the second position by the rotation of the rotary member.

In particular, a retraction space may be provided in the housing, and at least a part of the cover member may be disposed in the retraction space in the state in which the cover member is disposed at the second position.

According to the exemplary embodiment of the present disclosure, the lamp for a vehicle may include a guide member provided in the housing and configured to guide the cover member to the retraction space.

The guide member is provided, and the cover member is guided to the retraction space along the path (e.g., the curved path defined along the inner surface of the guide member) defined by the guide member as described above. Therefore, the retraction space may be freely defined in the housing regardless of the movement direction of the cover member. Therefore, a vacant space in the housing may be used as the retraction space by means of the guide member without change the internal structure of the housing.

According to the exemplary embodiment of the present disclosure, a penetration pattern may be provided on the cover member.

In particular, a first lighting image may be provided when the light source is turned on in a state in which the cover member is positioned at the first position, and a second lighting image, which is different from the first lighting image, may be provided when the light source is turned on in a state in which the cover member is positioned at the second position.

As described above, the embodiment of the present disclosure may selectively change the lighting image (the first lighting image the second lighting image) made by the lamp without additionally providing the light source and the optical system. Therefore, it is possible to obtain an advantageous effect of diversifying the lighting images of the lamp and improving the marketability and design characteristics of the lamp.

According to the exemplary embodiment of the present disclosure, the lamp for a vehicle may include an outer lens provided in front of the inner lens and forming a part of an exterior of the lamp In addition, according to the exemplary embodiment of the present disclosure, the lamp for a vehicle may include a bezel provided between the cover member and the outer lens. The bezel has an opening portion that guides the light beams, emitted from the light source, to an outside of the lamp. The cover member may selectively close the opening portion.

According to the exemplary embodiment of the present disclosure, the cover member may rotate from the first position to the second position.

The drive part may have various structures capable of rotating the cover member from the first position to the second position.

For example, the drive part may include: a driving source; and a link module configured to connect the driving source and the cover member and convert a driving power of the driving source into a rotation of the cover member, and the cover member may be rotated selectively from the first position to the second position by the link module.

For example, the link module may include: a first link member configured to be rotated by the driving source; a second link member rotatably connected to the first link member; and a third link member rotatably connected to the second link member and connected to the cover member, and the second link member and the third link member may operate in conjunction with the rotation of the first link member and rotate the cover member.

DETAILED DESCRIPTION OF THE INVENTION

Figure 1:
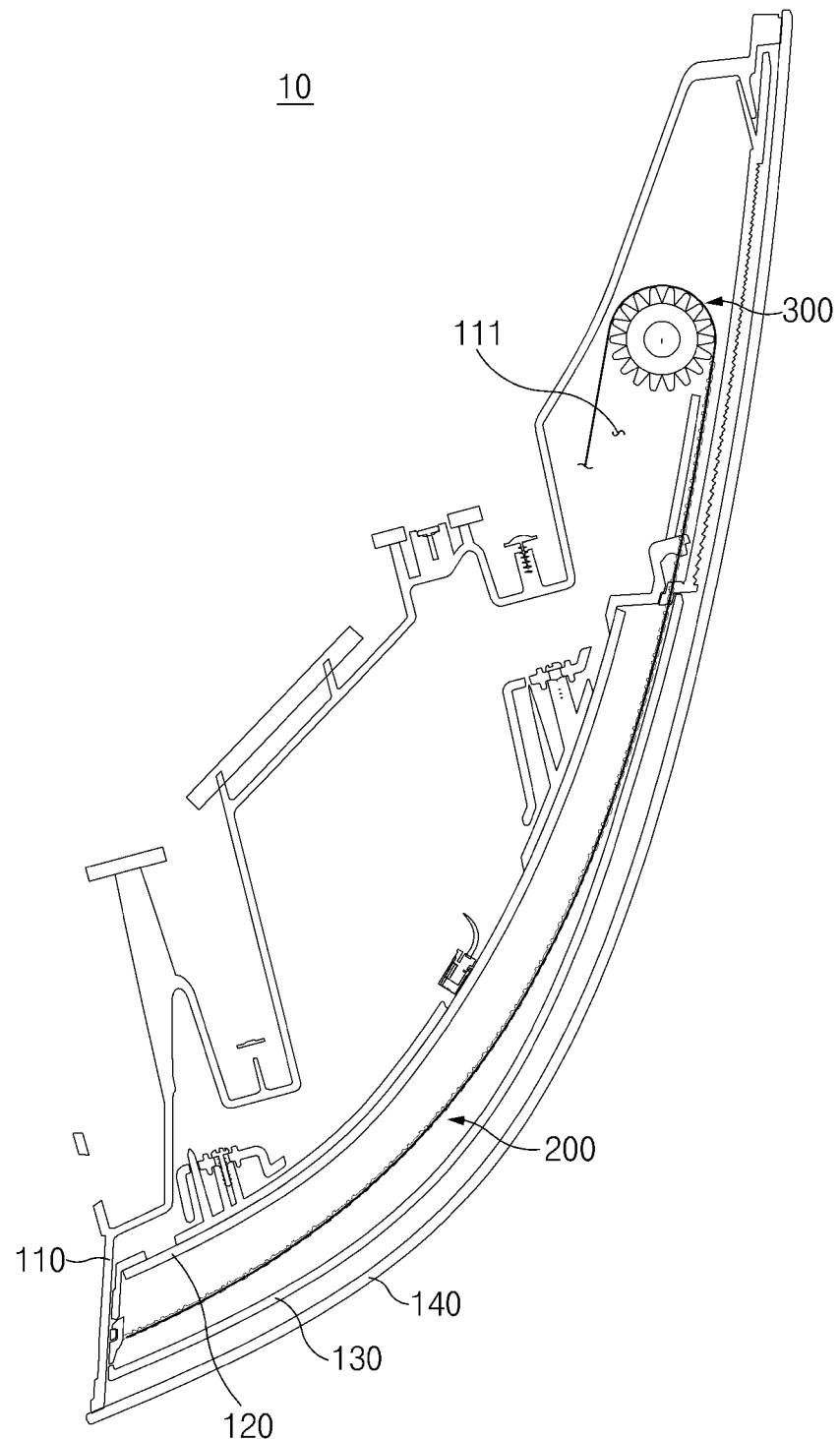
FIG. 1 is a view for explaining a lamp for a vehicle according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a lamp 10 for a vehicle according to an embodiment of the present disclosure includes: a light source 120 provided in a housing 110; an inner lens 130 provided in front of the light source 120; a cover member 200 disposed between the inner lens 130 and the light source 120 and configured to move between a first position at which a front side of the light source 120 is opened and a second position at which the front side of the light source 120 is closed; and a drive part 300 configured to selectively move the cover member 200 from the first position to the second position.

For reference, the lamp 10 for a vehicle according to the embodiment of the present disclosure may be mainly used for a lighting function (e.g., headlamps or fog lamps) or for a signal function (e.g., turn signal lamps, tail lamps, brake lamps, or side markers), and the present disclosure is not restricted or limited by the use of the lamp 10 for a vehicle.

For example, the lamp 10 for a vehicle according to the embodiment of the present disclosure may be provided at each of the front-left and front-right sides of the vehicle and used to provide a nighttime lighting beam pattern (a low-beam pattern or a high-beam pattern), a daytime running beam pattern, and a turn-signal beam pattern for a vehicle.

The light source 120 is provided to emit light beams to a location in front of the vehicle. The light source 120 is mounted in the housing 110.

For reference, in the embodiment of the present disclosure, the configuration in which the light source emits the light beam to a location in front of the vehicle may mean that the light source emits the light beam in a direction in which the vehicle travels. The direction, which means the term 'front', may be changed depending on the installation position and installation direction of the lamp 10 for a vehicle.

The housing 110 may have various structures having an accommodation space therein, and the present disclosure is not restricted or limited by the structure and shape of the housing 110.

Various types of objects or devices capable of emitting the light beam may be used as the light source 120, and the present disclosure is not restricted or limited by the type and property of the light source 120.

For example, a light-emitting diode (LED), which is a semiconductor light-emitting element, may be used as the light source 120. In accordance with required conditions and design specifications, a plurality of LEDs may be used to emit the light beams with the same color or different colors. According to another embodiment of the present disclosure, a laser diode, a bulb, a halogen lamp, a xenon lamp (HID), or the like may be used as the light source.

For reference, in the embodiment of the present disclosure, the example will be described in which the light beam emitted from the light source 120 propagates forward. However, according to another embodiment of the present disclosure, the light beam emitted from the light source may be reflected by a reflector (not illustrated) and then propagate to the location in front of the vehicle.

The inner lens 130 is provided in front of the light source 120 and transmits the light beam, emitted from the light source 120, to the location in front of the vehicle.

Various types of lenses capable of transmitting the light beam, emitted from the light source 120, to the outside may be used as the inner lens 130, and the present disclosure is not restricted or limited by the type and structure of the inner lens 130. For example, a typical aspherical lens may be used as the inner lens 130.

The cover member 200 is disposed between the inner lens 130 and the light source 120. The cover member 200 may be moved between the first position allow the front side of the light source 120 is opened and the second position at which the front side of the light source 120 is closed.

For reference, in the embodiment of the present disclosure, the configuration in which the cover member 200 is disposed at the first position may mean that the front side of the light source 120 is opened (the light source and the structure at the periphery of the light source are exposed to the outside) so that the light source 120 and the structure at the periphery of the light source 120 are not hidden by the cover member 200. In addition, the configuration in which the cover member 200 is disposed at the second position may mean that the front side of the light source 120 is closed so that the light source 120 and the structure at the periphery of the light source 120 are covered by the cover member 200.

The cover member 200 may move from the first position to the second position (or from the second position to the first position) by various methods in accordance with required conditions and design specifications. The present disclosure is not restricted or limited by the method of moving the cover member 200.

For reference, in the embodiment of the present disclosure, the configuration in which the cover member 200 moves from the first position to the second position may include both a configuration in which the cover member 200 linearly (e.g., rectilinearly) moves from the first position to the second position and a configuration in which the cover member 200 rotates from the first position to the second position.

For example, the cover member 200 may linearly move from the first position to the second position along a predefined curved trajectory. According to another embodiment of the present disclosure, the cover member may be configured to move along a straight trajectory or other linear trajectories.

The cover member 200 may have various structures capable of selectively closing the front side of the light source 120, and the present disclosure is not restricted or limited by the structure of the cover member 200.

For example, the cover member 200 may include a first cover block 210, a second cover block 220 connected to the first cover block 210, and a third cover block 230 connected to the second cover block 220.

For example, the first to third cover blocks 210, 220, and 230 may be continuously connected in a longitudinal direction of the light source 120 (i.e., a direction in which the light source 120 is disposed). The first to third cover blocks 210, 220, and 230 may cooperatively constitute the cover member 200 having an approximately band shape having a length longer than a width thereof.

The number of cover blocks and the structure for connecting the cover blocks constituting the cover member 200 may be variously changed in accordance with required conditions and design specifications. The present disclosure is not restricted or limited by the number of cover blocks and the structure for connecting the cover blocks.

For example, any one of the adjacent cover blocks may be connected to the other of the adjacent cover blocks by a flexible or bendable structure.

For reference, in another embodiment of the present disclosure illustrated and described above, the example has been described in which the cover member 200 includes the plurality of cover blocks. However, according to another embodiment of the present disclosure, the cover member may be configured as a single member (e.g., a single cover block).

According to the exemplary embodiment of the present disclosure, the lamp 10 for a vehicle may include: guide grooves 112 provided in the housing 110 in a movement direction of the cover member 200; and guide rails 202 provided on the cover member 200 and accommodated in the guide grooves 112 so as to be linearly movable.

For example, the housing 110 may have the guide groove 112 shaped to correspond to the movement trajectory (e.g., the linear trajectory) of the cover member 200, and the guide rail 202 provided on the cover member 200 may linearly move along the guide groove 112.

For example, the guide rails 202 may be provided at one end and the other end of each of the plurality of cover blocks (e.g., the first to third cover blocks) constituting the cover member 200. According to another embodiment of the present disclosure, the guide rail may be provided only at one end or the other end of the cover block. Alternately, the guide rails may be provided on only some of the plurality of cover blocks constituting the cover member.

Since the guide rails 202 provided on the cover member 200 move along the guide grooves 112 provided in the housing 110 as described above, the stable linear movement of the cover member 200 relative to the housing 110 may be ensured. Therefore, it is possible to obtain an advantageous effect of inhibiting the separation of the cover member 200 and stably maintaining the arrangement state of the cover member 200.

The drive part 300 is provided to selectively move the cover member 200 from the first position to the second position.

The drive part 300 may have various structures capable of moving the cover member 200, and the present disclosure is not restricted or limited by the structure and operational structure of the drive part 300.

For example, the drive part 300 may include a driving source 310, and a rotary member 320 provided to be rotatable by the driving source 310 and connected to the cover member 200. The cover member 200 may be linearly moved selectively from the first position to the second position by the rotation of the rotary member 320.

A typical actuator (e.g., a motor) capable of rotating the rotary member 320 may be used as the driving source 310, and the present disclosure is not restricted or limited by the type and structure of the driving source 310.

The rotary member 320 may be connected to (e.g., may mesh with or be in friction contact with) an inner surface of the cover member 200. When the rotary member 320 rotates, the cover member 200 may linearly move from the first position to the second position (or from the second position to the first position). For example, based on FIG. 6, the cover member 200 may linearly move in the right direction when the rotary member 320 rotates counterclockwise, and the cover member 200 may linearly move in the left direction when the rotary member 320 rotates clockwise.

In particular, a retraction space 111 may be provided in the housing 110, and at least a part of the cover member 200 may be disposed in the retraction space 111 in the state in which the cover member 200 is disposed at the second position.

More particularly, the retraction space 111 may be defined in a region (e.g., a lateral region of the light source 120 or a rear region of the light source 120) that does not cover the front side of the light source 120. In the state in which the cover member 200 is retracted to the retraction space 111, the front side of the light source 120 may be entirely opened without being covered by the cover member 200.

According to the exemplary embodiment of the present disclosure, the lamp 10 for a vehicle may include a guide member 400 provided in the housing 110 and configured to guide the cover member 200 to the retraction space 111.

The guide member 400 may have various structures capable of guiding the cover member 200 to the retraction space 111, and the present disclosure is not restricted or limited by the structure of the guide member 400.

For example, the guide member 400 may have a cross-section having an approximately 'U' shape. The cover member 200, which is moved by the rotary member 320, may be guided to the retraction space 111 along an inner surface of the guide member 400.

The guide member 400 is provided, and the cover member 200 is guided to the retraction space 111 along the curved path (e.g., the path defined along the inner surface of the guide member) defined by the guide member 400 as described above. Therefore, the retraction space 111 may be freely defined in the housing 110 regardless of the movement direction of the cover member 200. Therefore, a vacant space in the housing 110 may be used as the retraction space 111 by means of the guide member 400 without change the internal structure of the housing 110.

According to the exemplary embodiment of the present disclosure, the cover member 200 may have penetration patterns 204.

The penetration pattern 204 may penetrate the cover member 200 in a thickness direction of the cover member 200. The penetration pattern 204 may be variously changed in shape and structure in accordance with required conditions and design specifications.

For example, the penetration pattern 204 may have an approximately straight shape. The penetration pattern 204 may be provided in plural, and the plurality of penetration patterns 204 may be provided to be spaced apart from one another in the longitudinal direction of the cover member 200. According to another embodiment of the present disclosure, the penetration pattern may have a closed loop structure (e.g., a circular shape) or a curved shape.

According to the exemplary embodiment of the present disclosure, the lamp 10 for a vehicle may include an outer lens 140 provided in front of the inner lens 130 and forming a part of an exterior of the lamp.

The outer lens 140 is provided in front of the inner lens 130, forms a part of an exterior of the lamp and protects the inner lens 130 and the components at the periphery of the inner lens 130 from moisture, dust, external impact, and the like.

The outer lens 140 may be made of a transparent or semi-transparent light transmissive material capable of transmitting the light, and the present disclosure is not restricted or limited by the material and structure of the outer lens 140.

In some instances, another optical member (not illustrated) capable of changing properties (e.g., luminous intensity, diffusibility, or straightness) of the light may be provided between the inner lens and the outer lens (or between the inner lens and the light source).

In addition, according to the exemplary embodiment of the present disclosure, the lamp 10 for a vehicle may include a bezel 150 provided between the cover member 200 and the outer lens 140. The bezel 150 has an opening portion 152 that guides the light beams, emitted from the light source 120, to the outside of the lamp. The cover member 200 may selectively close the opening portion 152.

Since the bezel 150 is provided between the cover member 200 and the outer lens 140 as described above, it is possible to obtain an advantageous effect of guiding the light beams, emitted from the light source 120, to the outer lens 140 and minimizing the exposure of the internal structure of the lamp 10 for a vehicle to the outside.

Meanwhile, when the cover member 200 is disposed at the second position at which the cover member 200 closes the front side of the light source 120, the light source 120 and the structure at the periphery of the light source 120 may be hidden by the cover member 200.

Figure 2:
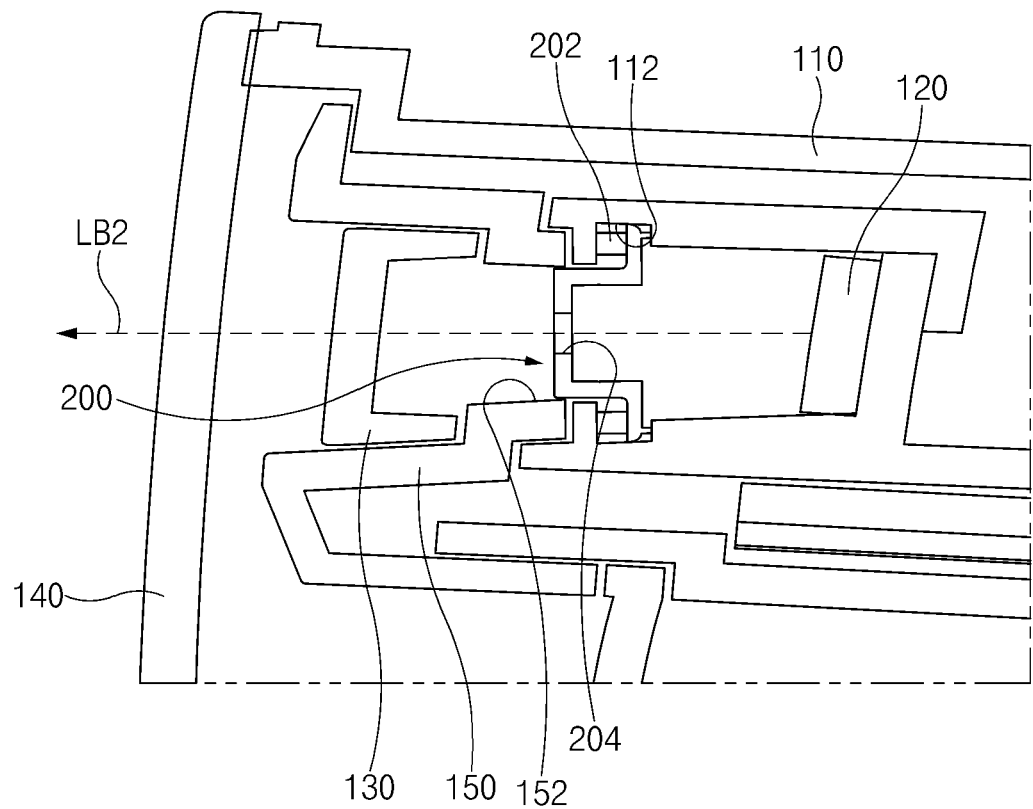
FIG. 2 is a view for explaining a cover member of the lamp for a vehicle according to the embodiment of the present disclosure.
Figure 3:
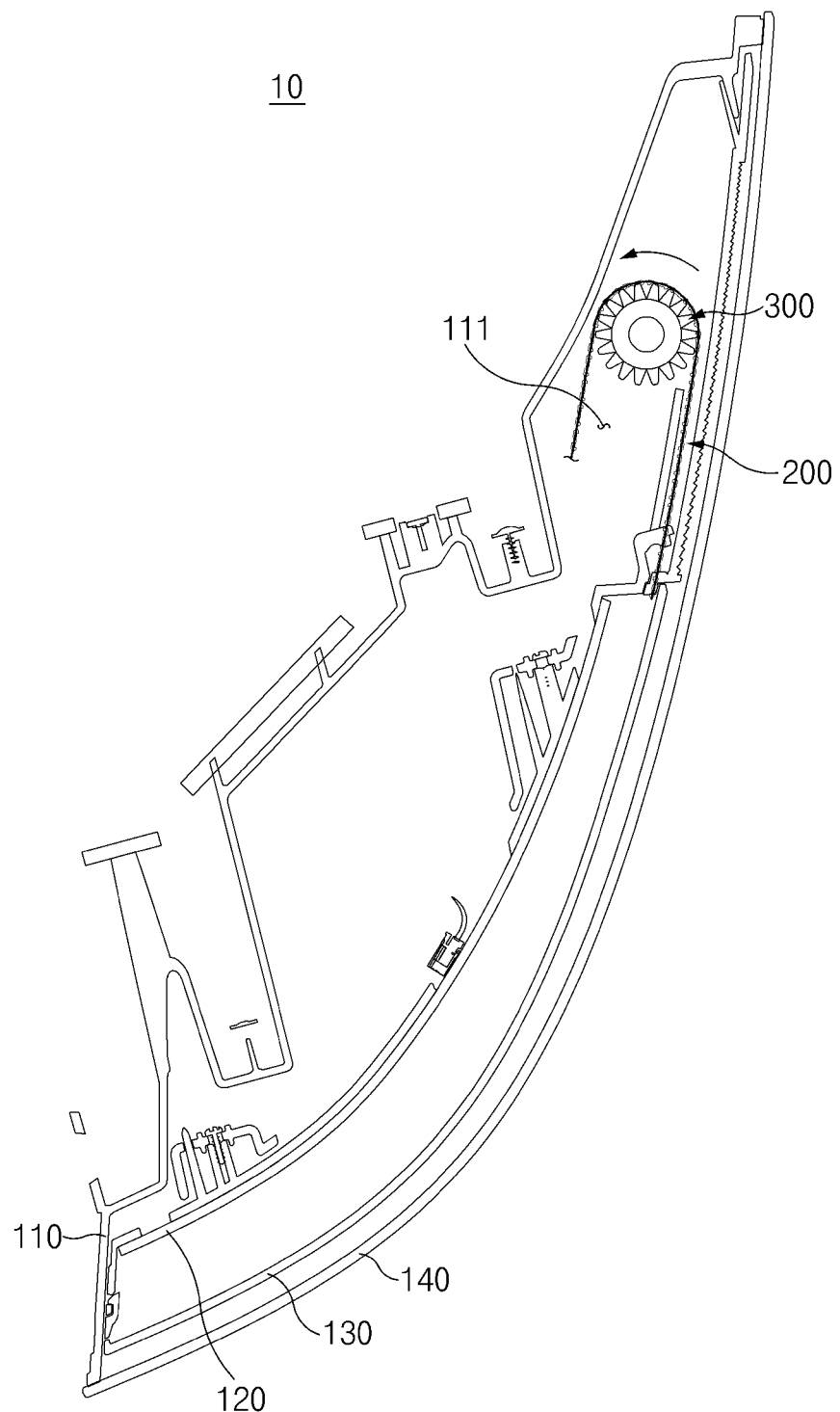
FIGS. 3 and 4 are views for explaining an operational structure of the cover member of the lamp for a vehicle according to the embodiment of the present disclosure.
Figure 7:
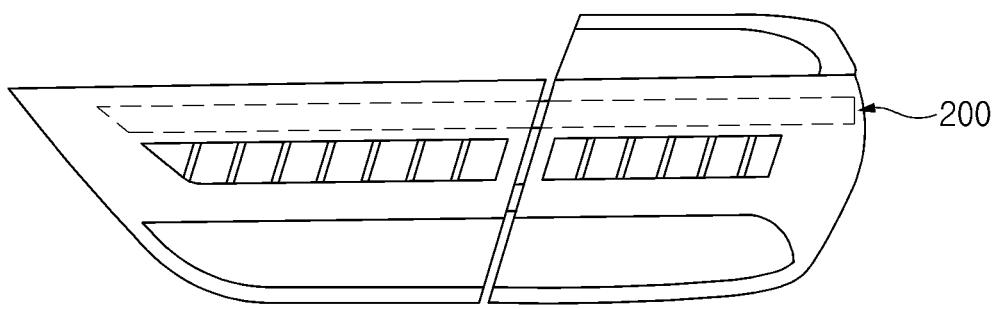
FIG. 7 is a view for explaining a state in which the cover member is disposed at a second position in the lamp for a vehicle according to the embodiment of the present disclosure.

That is, referring to FIGS. 1 to 2 and 7, in the state in which the cover member 200 is disposed at the second position, the front side of the light source 120 may be closed by the cover member 200, and the light source 120 and the structure at the periphery of the light source 120 may be hidden by the cover member 200.

As described above, the light source 120 and the structure at the periphery of the light source 120 are hidden by the cover member 200 in a state in which the lamp 10 for a vehicle is turned off. Therefore, it is possible to obtain an advantageous effect of implementing an external aesthetic appearance of the lamp and improving design characteristics of the lamp.

In contrast, in a state in which the lamp 10 for a vehicle is turned on, the cover member 200 may be disposed at the first position or the second position, thereby providing different lighting images (e.g., a first lighting image and a second lighting image).

Figure 4:
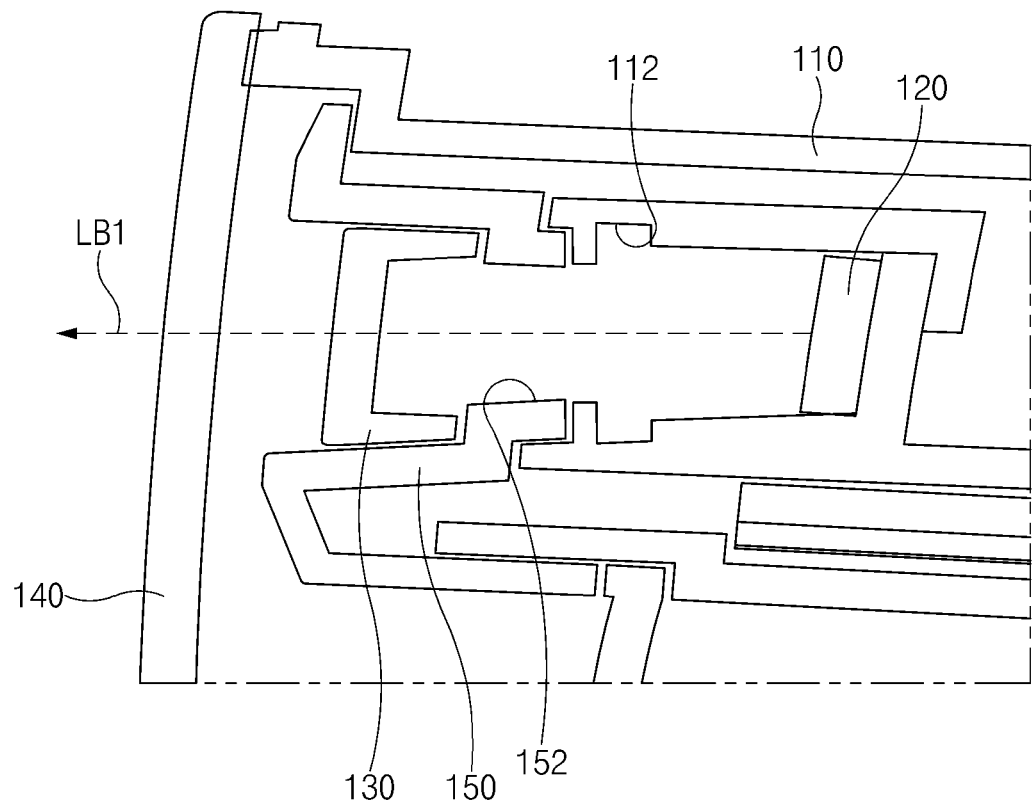
Figure 5:
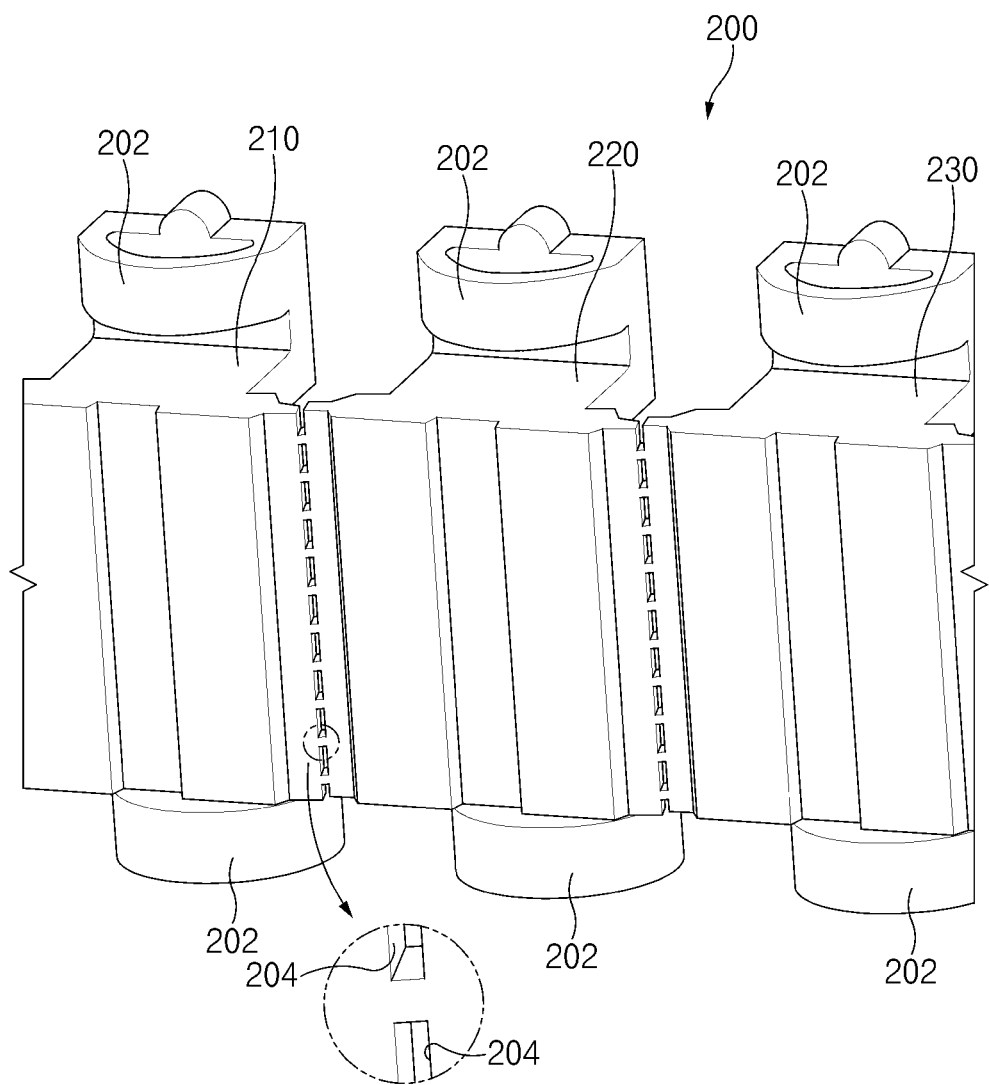
FIG. 5 is a view for explaining a structure of the cover member of the lamp for a vehicle according to the embodiment of the present disclosure.
Figure 6:
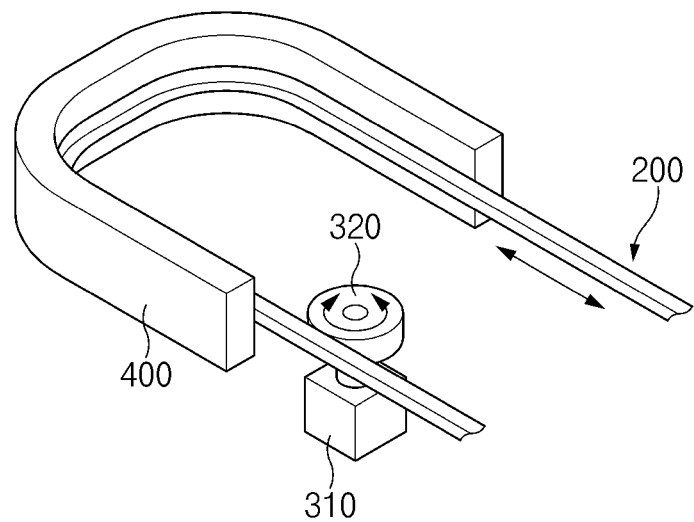
FIG. 6 is a view for explaining a drive part of the lamp for a vehicle according to the embodiment of the present disclosure.
Figure 8:
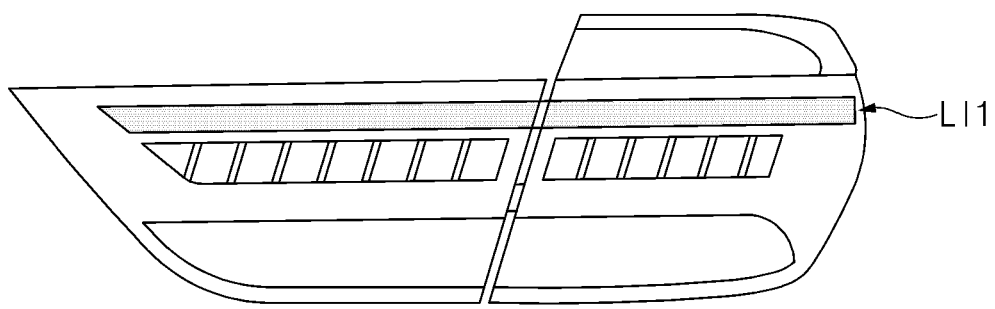
FIG. 8 is a view for explaining a first lighting image in a state in which the cover member is disposed at a first position in the lamp for a vehicle according to the embodiment of the present disclosure.

Referring to FIGS. 4 and 8, when the light source 120 is turned on in the state in which the cover member 200 is disposed at the first position at which the front side of the light source 120 is opened, the lamp 10 for a vehicle may provide the first lighting image (e.g., a linear lighting image). For example, the first lighting image LI1 may be provided by the light beam LB1 (see FIG. 4) passing through the opening portion 152 of the bezel 150.

Figure 9:
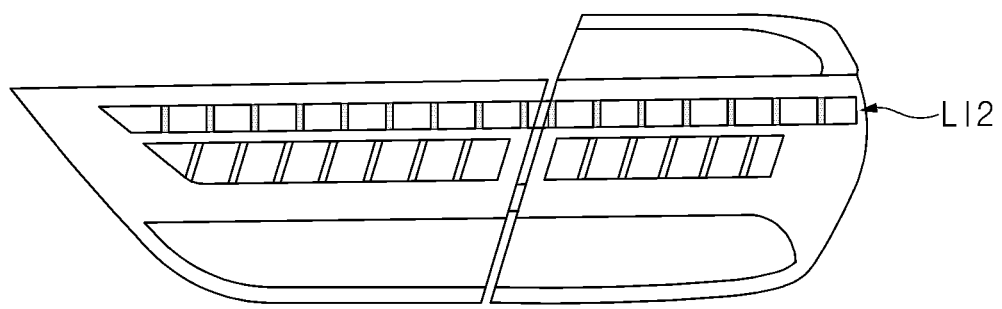
FIG. 9 is a view for explaining a second lighting image in a state in which the cover member is disposed at the second position in the lamp for a vehicle according to the embodiment of the present disclosure.

Referring to FIGS. 2 and 9, when the light source 120 is turned on in the state in which the cover member 200 is disposed at the second position at which the front side of the light source 120 is closed, the lamp 10 for a vehicle may provide the second lighting image (e.g., a dot-shaped lighting image) different from the first lighting image. For example, the second lighting image LI2 may be provided between light beam LB2 (see FIG. 2) passing through the plurality of penetration patterns 204.

As described above, the embodiment of the present disclosure may selectively change the lighting image (the first lighting image↔the second lighting image) made by the lamp without additionally providing the light source 120 and the optical system. Therefore, it is possible to obtain an advantageous effect of diversifying the lighting images of the lamp and improving the marketability and design characteristics of the lamp.

Meanwhile, in the embodiment of the present disclosure illustrated and described above, the example has been described in which the cover member 200 linearly moves from the first position to the second position. Hereinafter, an example will be described in which a cover member 200' rotates from a first position to a second position.

Further, the parts identical and equivalent to the parts in the above-mentioned configuration will be designated by the identical or equivalent reference numerals, and detailed descriptions thereof will be omitted.

Referring to FIGS. 10 to 13, a lamp 10 for a vehicle according to another embodiment of the present disclosure includes: a light source 120 provided in a housing 110; an inner lens 130 provided in front of the light source 120; a cover member 200' disposed between the inner lens 130 and the light source 120 and configured to move between a first position at which a front side of the light source 120 is opened and a second position at which the front side of the light source 120 is closed; and a drive part 300' configured to selectively move the cover member 200' from the first position to the second position. The cover member 200' may be configured to rotate from the first position to the second position.

The cover member 200' may be variously changed in rotational structure in accordance with required conditions and design specifications, and the present disclosure is not restricted or limited by the rotational structure of the cover member 200'.

For example, the cover member 200' may rotate about a horizontal rotation axis (not illustrated) provided in front of the light source 120. The cover member 200' may rotate from the first position to the second position.

In particular, the cover member 200' may be disposed at the first position so as to be parallel to the direction (optical axis direction) in which the light beam is emitted from the light source 120. The cover member 200' may be disposed at the second position so as to be perpendicular to the direction in which the light beam is emitted from the light source 120.

According to another embodiment of the present disclosure, the cover member 200' may rotate from the first position to the second position while rotating about a rotation axis provided an upper side (or a lower side) or a lateral side of the light source 120.

The drive part 300' may have various structures capable of rotating the cover member 200' from the first position to the second position. The present disclosure is not restricted or limited by the structure and operational structure of the drive part 300'.

For example, the drive part 300' may include a driving source 310', and a link module 320' configured to connect the driving source 310' and the cover member 200' and convert a driving power of the driving source 310' into a rotation of the cover member 200'. The cover member 200' may be selectively moved from the first position to the second position by the link module 320'.

A typical actuator (e.g., a motor) capable of rotating the rotary member 320 may be used as the driving source 310', and the present disclosure is not restricted or limited by the type and structure of the driving source 310'.

The link module 320' may have various structures capable of converting the driving power of the driving source 310' into the rotation of the cover member 200'.

Figure 12:
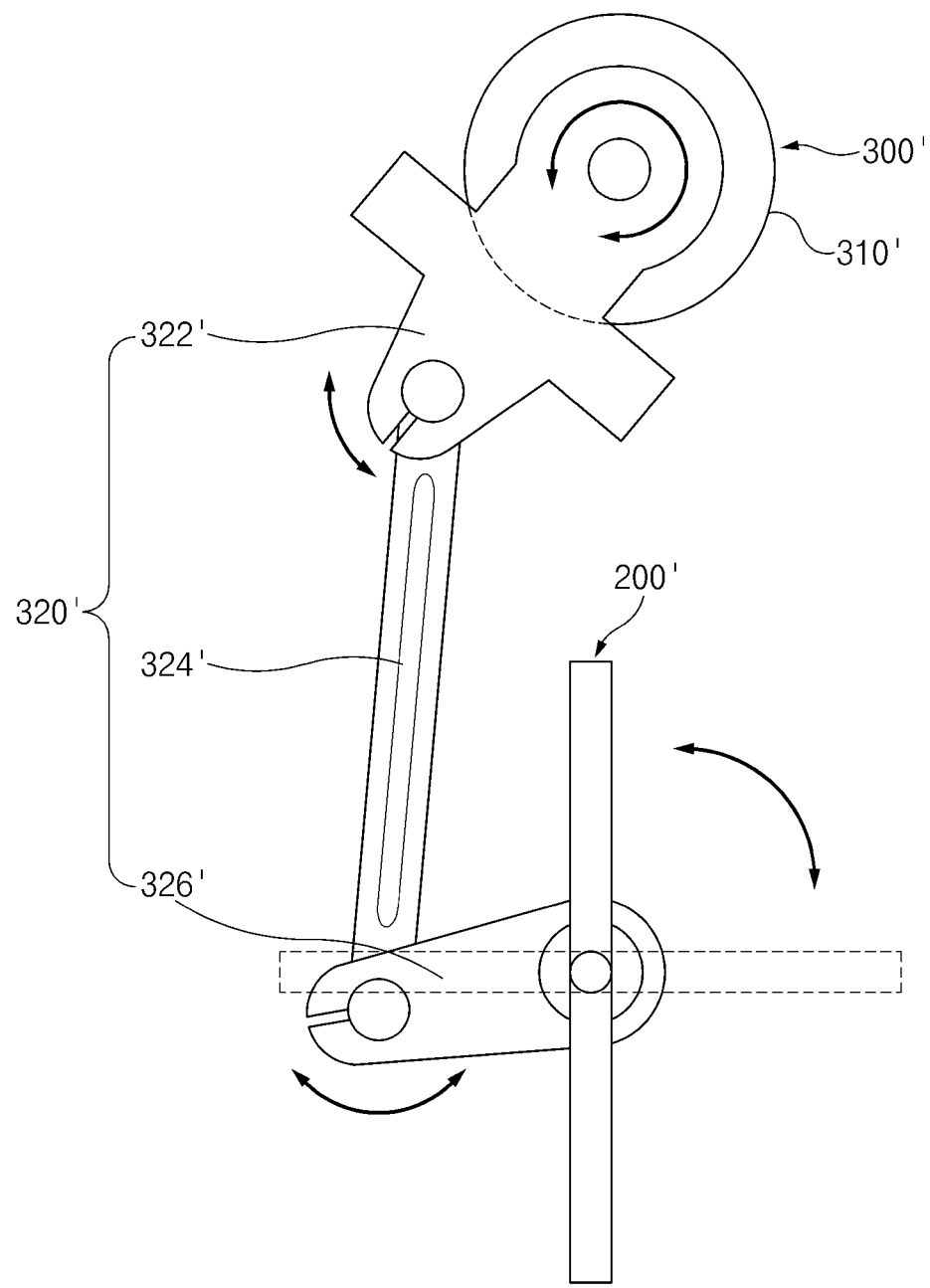
FIG. 12 is a view for explaining a drive part of the lamp for a vehicle according to another embodiment of the present disclosure.

For example, referring to FIG. 12, the link module 320' may include a first link member 322' configured to be rotated by the driving source 310', a second link member 324' rotatably connected to the first link member 322', a third link member 326' rotatably connected to the second link member 324' and connected to the cover member 200'. The second link member 324' and the third link member 326' may operate in conjunction with the rotation of the first link member 322' and rotate the cover member 200'.

When the first link member 322' is rotated by the driving power of the driving source 310', the second link member 324' and the third link member 326' sequentially operate, such that the cover member 200' may rotate from the first position to the second position.

For reference, in the embodiment of the present disclosure, the example has been described in which the link module 320' includes the three link members. However, according to another embodiment of the present disclosure, the link module may include two or fewer link members or four or more link members. The present disclosure is not restricted or limited by the number of link members and the structure of the link members constituting the link module.

Figure 10:
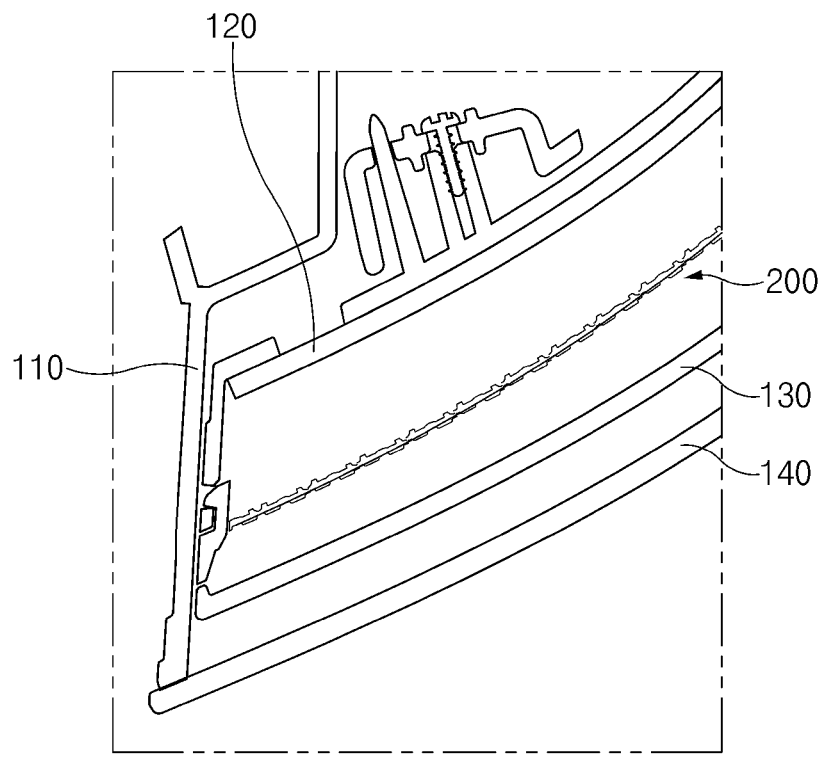
FIG. 10 is a view for explaining a state in which a cover member is disposed at a second position in a lamp for a vehicle according to another embodiment of the present disclosure.
Figure 13:
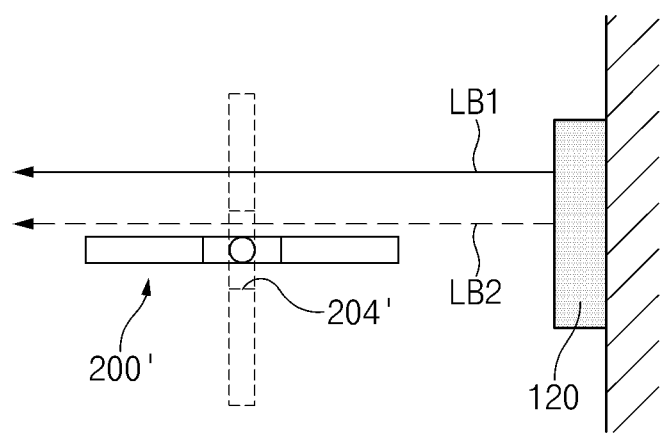
FIG. 13 is a view for explaining an operational structure of the cover member of the lamp for a vehicle according to another embodiment of the present disclosure.

Referring to FIGS. 10 and 13, in the state in which the cover member 200' is rotated to be disposed at the second position, the front side of the light source 120 may be closed by the cover member 200', and the light source 120 and the structure at the periphery of the light source 120 may be hidden by the cover member 200'.

Figure 11:
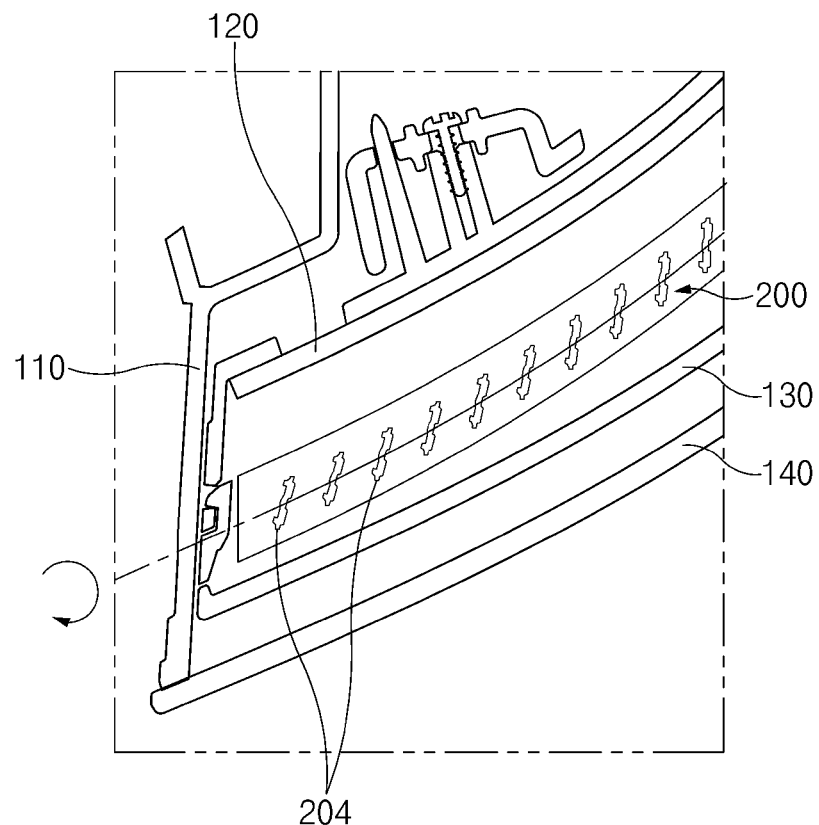
FIG. 11 is a view for explaining a state in which the cover member is disposed at a first position in the lamp for a vehicle according to another embodiment of the present disclosure.

Referring to FIGS. 11 and 13, when the light source 120 is turned on in the state in which the cover member 200' is rotated to be disposed at the first position at which the front side of the light source 120 is opened, the lamp 10 for a vehicle may provide the first lighting image (e.g., the linear lighting image). For example, the first lighting image LI1 (see FIG. 8) may be provided by the light beam passing through the opening portion 152 (see FIG. 4) of the bezel 150.

Referring to FIG. 13, when the light source 120 is turned on in the state in which the cover member 200' is rotated to be disposed at the second position at which the front side of the light source 120 is closed, the lamp 10 for a vehicle may provide the second lighting image (e.g., the dot-shaped lighting image) different from the first lighting image. For example, the second lighting image LI2 (see FIG. 9) may be provided by the light beam LB2 (FIG. 2) passing through the plurality of penetration patterns 204.

According to the embodiment of the present disclosure described above, it is possible to obtain an advantageous effect of improving the marketability and design characteristics of the lamp.

In particular, according to the embodiment of the present disclosure, it is possible to obtain an advantageous effect of selectively hiding the internal structure of the lamp and improving the design characteristics of the lamp.

In addition, according to the embodiment of the present disclosure, it is possible to obtain an advantageous effect of producing the high-grade product, improving marketability, and satisfying a user's needs.

In addition, the embodiment of the present disclosure may selectively change the lighting image made by the lamp without additionally providing the light source and the optical system. Therefore, it is possible to obtain an advantageous effect of diversifying the lighting images of the lamp and improving the marketability and design characteristics of the lamp.

In addition, according to the embodiment of the present disclosure, it is possible to obtain an advantageous effect of simplifying the structure of the lamp and the process of manufacturing the lamp.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:
1. A lamp for a vehicle, comprising:
a light source positioned within a housing;
an inner lens positioned in front of the light source;
a cover member positioned between the inner lens and the light source and configured to move along a linear path between first and second positions, wherein the cover member is configured to expose a front side of the light source when positioned at the first position and block the front side of the light source when positioned at the second position; and
a drive part configured to selectively move the cover member between the first and second positions.

2. The lamp of claim 1, wherein the cover member is configured to laterally move between the first and second positions along the linear path.

3. The lamp of claim 2, wherein the cover comprises:
a first cover block; and
a second cover block connected to the first cover block.

4. The lamp of claim 2, wherein the drive part comprises:
a driving source; and
a rotary member connected to the cover member and configured to rotate when driven by the driving source, and
wherein the cover member is configured to move along the linear path between the first and second positions when the rotary member rotates.

5. The lamp of claim 4, wherein:
the housing comprises an inner retraction space, and
at least a part of the cover member is positioned in the inner retraction space when positioned at the second position.

6. The lamp of claim 5, further comprising a guide member provided in the housing and configured to guide the cover member to the inner retraction space.

7. The lamp of claim 1, comprising a penetration pattern provided on the cover member.

8. The lamp of claim 7, wherein:
a first lighting image is formed when the light source is turned on and the cover member is positioned at the first position, and
a second lighting image, which is different from the first lighting image, is formed when the light source is turned on and the cover member is positioned at the second position.

9. The lamp of claim 1, further comprising an outer lens provided in front of the inner lens and forming a part of an exterior of the lamp.

10. The lamp of claim 9, comprising:
a bezel provided between the cover member and the outer lens and having an opening configured to guide a light beam emitted from the light source to an outside of the lamp,
wherein the cover member is configured to selectively close the opening.

11. A lamp for a vehicle, comprising:
a light source positioned within a housing;
an inner lens positioned in front of the light source;
a cover member positioned between the inner lens and the light source and configured to move between first and second positions, wherein the cover member is configured to expose a front side of the light source when positioned at the first position and block the front side of the light source when positioned at the second position;
a drive part configured to selectively move the cover member between the first and second positions;
a guide groove positioned at the housing and extending in a movement direction of the cover member; and
a guide rail positioned at the cover member and accommodated in the guide groove.

12. A lamp for a vehicle comprising:
a light source positioned in a housing;
an inner lens positioned in front of the light source;
a cover member positioned between the inner lens and the light source and configured to move between first and second positions, wherein the cover member is configured to expose a front side of the light source when positioned at the first position and block the front side of the light source when positioned at the second position; and
a drive part configured to selectively move the cover member between the first and second positions,
wherein the cover member is configured to rotate between the first and second positions,
wherein the cover member is arranged parallel to a direction of a light beam emitted from the light source when positioned at the first position, and
wherein the cover member is arranged perpendicular to the direction of the light beam when positioned at the second position.

13. The lamp of claim 12, wherein the drive part comprises:
a driving source; and
a link module connected to the driving source and the cover member and configured to convert a driving power from the driving source into a rotational movement of the cover member, and
wherein the cover member is configured to move between the first and second positions when rotated by the link module.

14. The lamp of claim 13, wherein the link module comprises:
a first link member configured to rotate when driven by the driving source;
a second link member rotatably connected to the first link member; and
a third link member rotatably connected to the second link member and connected to the cover member, and
wherein the second and third link members are configured to rotate the cover member in conjunction with the rotation of the first link member.

* * * * *